US010956000B2

(12) United States Patent
Cheng et al.

(10) Patent No.: US 10,956,000 B2
(45) Date of Patent: Mar. 23, 2021

(54) METHOD FOR PRESENTATION BY TERMINAL DEVICE, AND TERMINAL DEVICE (71) Applicant: Huawei Technologies Co., Ltd., Guangdong (CN)

(72) Inventors: Liang Cheng, Beijing (CN); Huaqi Hao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/251,845

(22) Filed: Jan. 18, 2019

(65) Prior Publication Data
US 2019/0155469 A1 May 23, 2019

Related U.S. Application Data (63) Continuation of application No. 15/033,524, filed as application No. PCT/CN2013/086459 on Nov. 1, 2013, now abandoned.

(51) Int. Cl.
*G06F 3/048* (2013.01)
*G06F 3/0484* (2013.01)
(Continued)

(52) U.S. Cl.
CPC .......... *G06F 3/0484* (2013.01); *G06F 3/0481* (2013.01); *G06F 3/0488* (2013.01);
(Continued)

(58) Field of Classification Search
CPC .... G06F 21/629; G06F 3/0484; G06F 3/0481; G06F 3/04883; G06F 3/0488; H04M 1/67; H04M 2250/22
See application file for complete search history.

(56) References Cited

U.S. PATENT DOCUMENTS

| 8,539,382 B2 | 9/2013 | Lyon et al. |
| 2009/0144649 A1 | 6/2009 | Strode et al. |

(Continued)

FOREIGN PATENT DOCUMENTS

| CN | 102035937 A | 4/2011 |
| CN | 102402381 A | 4/2012 |

(Continued)

OTHER PUBLICATIONS

U.S. Appl. No. 15/033,524, filed Apr. 29, 2016.

*Primary Examiner* — Alex Olshannikov
(74) *Attorney, Agent, or Firm* — Leydig, Voit & Mayer, Ltd.

(57) ABSTRACT

The technical solutions provide a method for presentation by a terminal device, and a terminal device, so as to reduce a memory burden of the terminal device, improve efficiency and an interaction capability, and facilitate use for a user. Specifically, a method for presentation by a terminal device is provided, where the method includes: when the mobile terminal is in a locked state, display, on the touch screen, the first interface, the first interface including an interface of a first application program (FAP), an interface of a second application program (SAP) and a first content determined by the mobile terminal based on a habit of using the mobile terminal by a user of the mobile terminal, the interface of the SAP occupying a second area on the touch screen, and the second area being part of the whole display area of the touch screen.

14 Claims, 8 Drawing Sheets

(51) Int. Cl.
  *G06F 3/0488*      (2013.01)
  *G06F 3/0481*      (2013.01)
  *H04M 1/67*        (2006.01)

(52) U.S. Cl.
  CPC .......... *G06F 3/04883* (2013.01); *H04M 1/67*
    (2013.01); *H04M 2250/22* (2013.01)

(56) References Cited

U.S. PATENT DOCUMENTS

| | | |
|---|---|---|
| 2009/0193514 A1 | 7/2009 | Adams et al. |
| 2010/0159995 A1* | 6/2010 | Stallings ............... G06F 3/0488 |
| | | 455/566 |
| 2011/0256848 A1 | 10/2011 | Bok et al. |
| 2012/0046079 A1 | 2/2012 | Kim et al. |
| 2012/0066644 A1* | 3/2012 | Mizutani ............... G06F 3/0482 |
| | | 715/810 |
| 2012/0299814 A1 | 11/2012 | Kwon et al. |
| 2012/0331548 A1 | 12/2012 | Tseng et al. |
| 2013/0036377 A1 | 2/2013 | Colley |
| 2013/0067376 A1 | 3/2013 | Kim et al. |
| 2013/0117689 A1* | 5/2013 | Lessing ................... G06F 3/041 |
| | | 715/752 |
| 2013/0174094 A1 | 7/2013 | Heo et al. |
| 2013/0326583 A1* | 12/2013 | Freihold ............. G06F 3/04815 |
| | | 726/3 |
| 2015/0074615 A1 | 3/2015 | Han et al. |
| 2016/0253062 A1 | 9/2016 | Cheng et al. |

FOREIGN PATENT DOCUMENTS

| | | |
|---|---|---|
| CN | 102801851 A | 11/2012 |
| CN | 102929522 A | 2/2013 |
| CN | 103034115 A | 4/2013 |
| CN | 103874985 A | 6/2014 |
| ET | 103019553 A | 4/2013 |
| ET | 103294344 A | 9/2013 |

* cited by examiner

METHOD FOR PRESENTATION BY TERMINAL DEVICE, AND TERMINAL DEVICE

CROSS-REFERENCE TO RELATED APPLICATIONS

This application is a continuation of U.S. patent application Ser. No. 15/033,524, filed on Apr. 29, 2016, which is a national stage of International Application No. PCT/CN2013/086459, filed on Nov. 1, 2013. Both of the aforementioned applications are hereby incorporated by reference in their entireties.

TECHNICAL FIELD

The present disclosure relates to the field of terminal devices, and in particular, to a method for presentation by a terminal device, and a terminal device.

BACKGROUND

Figure 12:
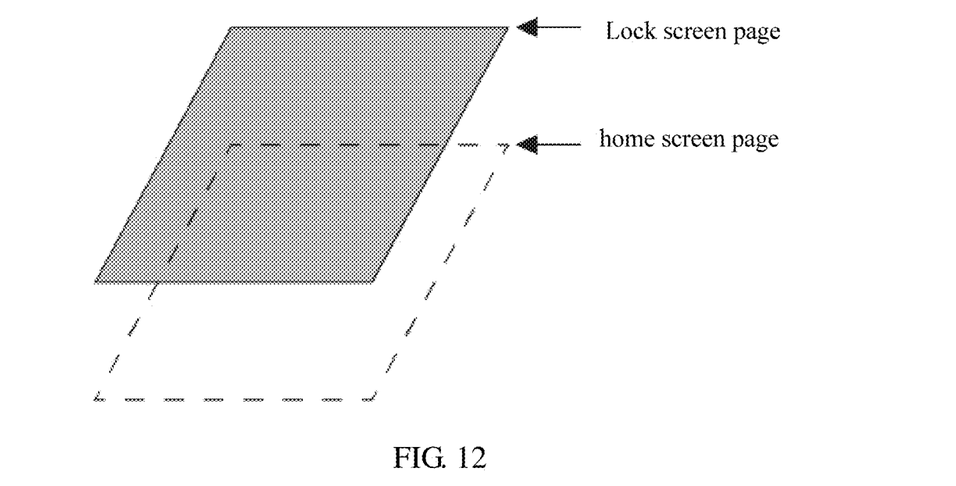
FIG. 12 is a schematic presentation diagram of the prior art according to an embodiment of the present invention.

As technologies advance, terminal devices become increasingly popular. When using a terminal device, a user often prevents misoperations by locking a screen. In current screen locking technologies, a relationship between a lock screen interface and a home interface is usually a hierarchical relationship (as shown in FIG. 12). The user generally needs to unlock by performing an operation (for example, sliding on or tapping some positions on the screen), so that the lock screen interface disappears, and the home interface is displayed. In this case, functions of the terminal device are activated, and multiple operations of the user can be responded to. After the terminal device enters an unlocked state, the lock screen interface cannot be presented, unless the terminal device is switched to a screen-locked state again. Such a method for preventing misoperations imposes a burden on both the terminal device and the user. First, a lock screen interface useless to most interactions needs to be added for the terminal device, which increases a memory burden of the terminal device and lowers use efficiency and an interaction capability of the terminal device. Second, the user cannot see content on the lock screen interface after the terminal device is unlocked, and needs to lock the terminal device again to view the content on the lock screen interface, which lowers operation efficiency of the user and brings much inconvenience to the user.

SUMMARY

The technical solutions provide a method for presentation by a terminal device, and a terminal device, so as to reduce a memory burden of the terminal device, improve efficiency and an interaction capability, and facilitate use for a user.

According to a first aspect, a method for presentation by a terminal device is provided, where the method includes: when the terminal device is in a locked state, presenting content of a first interface; acquiring user input; if the user input meets a preset first condition, switching the terminal device to an unlocked state; and presenting content of the first interface after the terminal device is switched to the unlocked state; where the user input to which the terminal device can respond in the unlocked state is more than the user input to which the terminal device can respond in the locked state, and the content that is of the first interface and presented when the terminal device is in the unlocked state is the same as the content that is of the first interface and presented when the terminal device is in the locked state.

With reference to the first aspect, in a first possible implementation manner of the first aspect, the content of the first interface specifically includes system-level content or application program-level content preset by the terminal device or/and a user, where the presetting by the terminal device includes presetting, by the terminal device according to a use habit of the user or/and a class of the user.

With reference to the first aspect or the first possible implementation manner of the first aspect, in a second possible implementation manner of the first aspect, the first interface is a first interface presented after the terminal device is switched to the unlocked state.

With reference to the first aspect or the first possible implementation manner of the first aspect, in a third possible implementation manner of the first aspect, the presenting content of the first interface after the terminal device is switched to the unlocked state specifically includes: after the terminal device is switched to the unlocked state, presenting content of a second interface; and after presenting the content of the second interface, presenting the content of the first interface, where the content of the first interface is different from the content of the second interface.

With reference to the first aspect, or the first possible implementation manner of the first aspect, or the second possible implementation manner of the first aspect, or the third possible implementation manner of the first aspect, in a fourth possible implementation manner of the first aspect, the first interface is a first interface presented when the terminal device is in the locked state.

With reference to the first aspect or the fourth possible implementation manner of the first aspect, in a fifth possible implementation manner of the first aspect, the user input to which the terminal device can respond in the locked state includes: the terminal device can start an application program according to the user input, and after the acquiring user input, and when the terminal device is in the locked state, the method further includes: starting the application program according to the user input; and presenting an interface of the application program.

With reference to the first aspect, or the first possible implementation manner of the first aspect, or the second possible implementation manner of the first aspect, or the third possible implementation manner of the first aspect, or the fourth possible implementation manner of the first aspect, or the fifth possible implementation manner of the first aspect, in a sixth possible implementation manner of the first aspect, after the acquiring user input, and when the terminal device is in the locked state, the method further includes: if the user input meets a preset second condition, presenting, according to the user input, content that is of the first interface and outside a current presentation range of the terminal device; or if the user input meets a preset second condition, and the content of the first interface is already fully presented in a current presentation range of the terminal device, prompting the user that the content of the first interface is already fully presented in the current presentation range of the terminal device.

With reference to the first aspect or the sixth possible implementation manner of the first aspect, in a seventh possible implementation manner of the first aspect, that the user input meets a preset first condition indicates that the user input meets a preset condition for unlocking the locked state of the terminal device; and that the user input meets a preset second condition indicates that the user input meets a preset condition for viewing information on the terminal device.

According to a second aspect, a terminal device is provided, where the terminal device includes: a locking unit, configured to enable the terminal device to be in a locked state; a presentation unit, configured to: when the locking unit enables the terminal device to be in the locked state, present content of a first interface; an acquiring unit, configured to acquire user input; and an unlocking unit, configured to: if the user input meets a preset first condition, switch the terminal device to an unlocked state; where the presentation unit is further configured to present content of the first interface after the unlocking unit switches the terminal device to the unlocked state, where the content that is of the first interface and presented when the terminal device is in the unlocked state is the same as the content that is of the first interface and presented when the terminal device is in the locked state, and the user input to which the terminal device can respond in the unlocked state is more than the user input to which the terminal device can respond in the locked state.

With reference to the second aspect, in a first possible implementation manner of the second aspect, the content of the first interface specifically includes: system-level content or application program-level content preset by a user; or system-level content or application program-level content preset by the terminal device according to a use habit of a user or a class of the user.

With reference to the second aspect or the first possible implementation manner of the second aspect, in a second possible implementation manner of the second aspect, the first interface is a first interface presented after the terminal device is switched to the unlocked state.

With reference to the second aspect or the first possible implementation manner of the second aspect, in a third possible implementation manner of the second aspect, the presentation unit is specifically configured to: when the locking unit enables the terminal device to be in the locked state, present the content of the first interface; after the unlocking unit switches the terminal device to the unlocked state, present content of a second interface; and after presenting the content of the second interface, present the content of the first interface, where the content of the first interface is different from the content of the second interface.

With reference to the second aspect, or the first possible implementation manner of the second aspect, or the second possible implementation manner of the second aspect, or the third possible implementation manner of the second aspect, in a fourth possible implementation manner of the second aspect, the first interface is a first interface presented when the terminal device is in the locked state.

With reference to the second aspect or the fourth possible implementation manner of the second aspect, in a fifth possible implementation manner of the second aspect, the terminal device further includes an application program unit, where the application program unit is configured to: when the locking unit enables the terminal device to be in the locked state, start an application program according to the user input acquired by the acquiring unit; and the presentation unit is further configured to: after the application program unit starts the application program, present an interface of the application program.

With reference to the second aspect, or the first possible implementation manner of the second aspect, or the second possible implementation manner of the second aspect, or the third possible implementation manner of the second aspect, or the fourth possible implementation manner of the second aspect, or the fifth possible implementation manner of the second aspect, in a sixth possible implementation manner of the second aspect, the presentation unit is further configured to: if the user input meets a preset second condition, present, according to the user input, content that is of the first interface and outside a current presentation range of the terminal device.

With reference to the second aspect, or the first possible implementation manner of the second aspect, or the second possible implementation manner of the second aspect, or the third possible implementation manner of the second aspect, or the fourth possible implementation manner of the second aspect, or the fifth possible implementation manner of the second aspect, or the sixth possible implementation manner of the second aspect, in a seventh possible implementation manner of the second aspect, the terminal device further includes a prompting unit, where the prompting unit is configured to: if the user input meets the preset second condition, and the content of the first interface is already fully presented in the current presentation range of the terminal device, prompt the user that the content of the first interface is already fully presented in the current presentation range of the terminal device.

With reference to the second aspect, or the sixth possible implementation manner of the second aspect, or the seventh possible implementation manner of the second aspect, in an eighth possible implementation manner of the second aspect, that the user input meets a preset first condition indicates that the user input meets a preset condition for unlocking the locked state of the terminal device; and that the user input meets a preset second condition indicates that the user input meets a preset condition for viewing information on the terminal device.

According to a third aspect, a terminal device is provided, where the terminal device includes a processor, a touchscreen, and a memory, where the memory is configured to store content of a first interface; the touchscreen is configured to: when the terminal device is in a locked state, present content of the first interface under control of the processor; the touchscreen is further configured to acquire user input; the processor is configured to: if the user input acquired by the touchscreen meets a preset first condition, switch the terminal device to an unlocked state; and the touchscreen is further configured to: after the unlocking unit switches the terminal device to the unlocked state, present content of the first interface under the control of the processor, where the content that is of the first interface and presented when the terminal device is in the unlocked state is the same as the content that is of the first interface and presented when the terminal device is in the locked state, and the user input to which the processor can respond when the terminal device is in the unlocked state is more than the user input to which the processor can respond when the terminal device is in the locked state.

With reference to the third aspect, in a first possible implementation manner of the third aspect, the content of the first interface specifically includes: system-level content or application program-level content preset by a user; or system-level content or application program-level content preset by the terminal device according to a use habit of a user or a class of the user.

With reference to the third aspect or the first possible implementation manner of the third aspect, in a second possible implementation manner of the third aspect, the first interface is a first interface presented after the terminal device is switched to the unlocked state.

With reference to the third aspect or the first possible implementation manner of the third aspect, in a third possible implementation manner of the third aspect, the memory is further configured to store content of a second interface; and the touchscreen is further configured to: after the processor switches the terminal device to the unlocked state, present content of the second interface under the control of the processor, and after presenting the content of the second interface, present the content of the first interface, where the content of the first interface is different from the content of the second interface.

With reference to the third aspect, or the first possible implementation manner of the third aspect, or the second possible implementation manner of the third aspect, or the third possible implementation manner of the third aspect, in a fourth possible implementation manner of the third aspect, the first interface is a first interface presented when the terminal device is in the locked state.

With reference to the third aspect or the fourth possible implementation manner of the third aspect, in a fifth possible implementation manner of the third aspect, the processor is further configured to: when the locking unit enables the terminal device to be in the locked state, start an application program according to the user input acquired by the touchscreen; and the touchscreen is further configured to: after the processor starts the application program, present an interface of the application program.

With reference to the third aspect, or the first possible implementation manner of the third aspect, or the second possible implementation manner of the third aspect, or the third possible implementation manner of the third aspect, or the fourth possible implementation manner of the third aspect, or the fifth possible implementation manner of the third aspect, in a sixth possible implementation manner of the third aspect, the processor is further configured to: if the user input acquired by the touchscreen meets a preset second condition, control, according to the user input, the touchscreen to present content that is of the first interface and outside a current presentation range of the terminal device.

With reference to the third aspect or the sixth possible implementation manner of the third aspect, in a seventh possible implementation manner of the third aspect, that the user input meets a preset first condition indicates that the user input meets a preset condition for unlocking the locked state of the terminal device; and that the user input meets a preset second condition indicates that the user input meets a preset condition for viewing information on the terminal device.

The embodiments of the present disclosure provide a method for presentation by a terminal device, and a terminal device, so as to reduce a memory burden of the terminal device, improve efficiency and an interaction capability, and facilitate use for a user.

BRIEF DESCRIPTION OF DRAWINGS

To describe the technical solutions in the embodiments of the present invention or in the prior art more clearly, the following briefly describes the accompanying drawings required for describing the embodiments. Apparently, the accompanying drawings in the following description show some embodiments of the present invention, and a person of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

The terms used in the embodiments of the present invention are merely for the purpose of illustrating specific embodiments, and are not intended to limit the present invention. The terms "a", "said" and "the" of singular forms used in the embodiments and the appended claims of the present invention are also intended to include plural forms, unless otherwise specified in the context clearly. It should also be understood that, the term "and/or" used herein indicates and includes any or all possible combinations of one or more associated listed items. It should be further understood that the term "include" used in the specification specifies presence of features, entirety, steps, operations, elements and/or components, with presence or attachment of other features, entirety, steps, operations, elements, components, and their combinations not excluded.

It should be understood that, although terms such as "first", "second", and "third" may be used in the embodiments of the present invention to describe various conditions or interfaces, these conditions or interfaces should not be limited by these terms. These terms are merely used to differentiate the various conditions or interfaces. For example, without departing from the scope of the embodiments of the present invention, a first interface may also be referred to as a second interface, and similarly the second interface may also be referred to as the first interface; and a first condition may also be referred to as a second condition, and similarly the second condition may also be referred to as the first condition.

In the embodiments of the present invention, a terminal device includes but is not limited to a mobile communications terminal device such as a mobile phone, a personal digital assistant (PDA), a tablet computer, and a portable terminal device (such as a portable computer), and also includes a terminal device that has a touchscreen, such as an automatic teller machine (ATM), and may further include a terminal device that has a touchscreen, such as a digital camera, which is not limited in the embodiments of the present invention.

The touchscreen may be an input/input interface by which a user interacts with the terminal device, and can present one or more graphics within an interface. The user can also use, for example, one or more fingers, to come into contact with or touch the one or more graphics, so as to select the graphic/graphics. In some embodiments, selecting one or more graphics occurs when the user releases contact with the one or more graphics. In some embodiments, selecting one or more graphics occurs when the user comes into contact with the one or more graphics. In some embodiments, contact may include a gesture, such as one or more taps, one or more swipes (from left to right, from right to left, upwards, and/or downwards), and sliding (from right to left, from left to right, upwards, and/or downwards) of a finger that is already in contact with the touchscreen. In some embodiments, a graphic is not selected when the user is unintentionally in contact with the graphic. It should be understood that, the contact in the present invention includes direct contact or indirect contact with the touchscreen, and further includes an air gesture operation over the touchscreen, which is not limited in the embodiments of the present invention.

Embodiment 1

Figure 1:
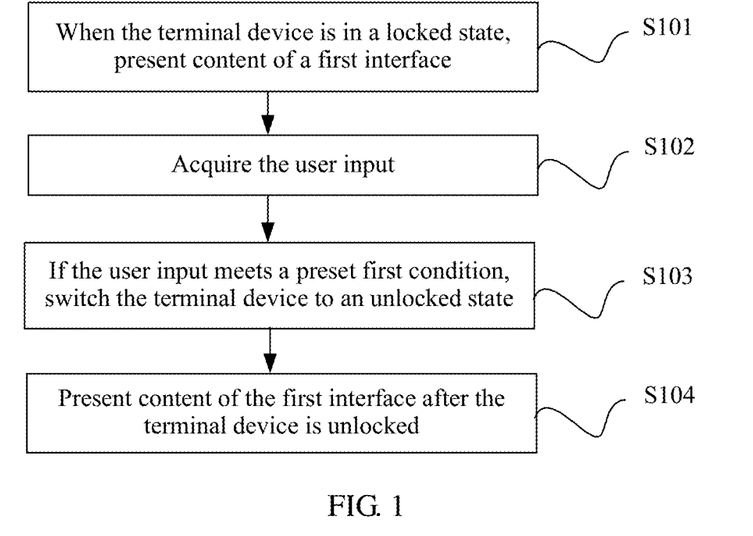
FIG. 1 is a flowchart of a method for presentation by a terminal device according to Embodiment 1 of the present invention.

FIG. 1 is a flowchart of a method for presentation by a terminal device according to Embodiment 1 of the present invention. As shown in FIG. 1, the method for presentation by the terminal device may include:

S101. When the terminal device is in a locked state, present content of a first interface.

Figure 5:
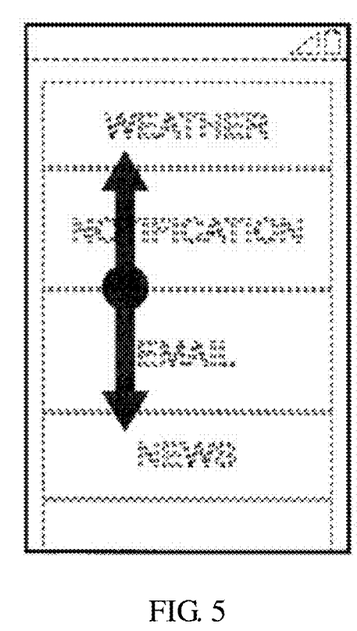
FIG. 5 is a schematic presentation diagram of presenting content of a first interface when a terminal device is in a locked state.
Figure 7:
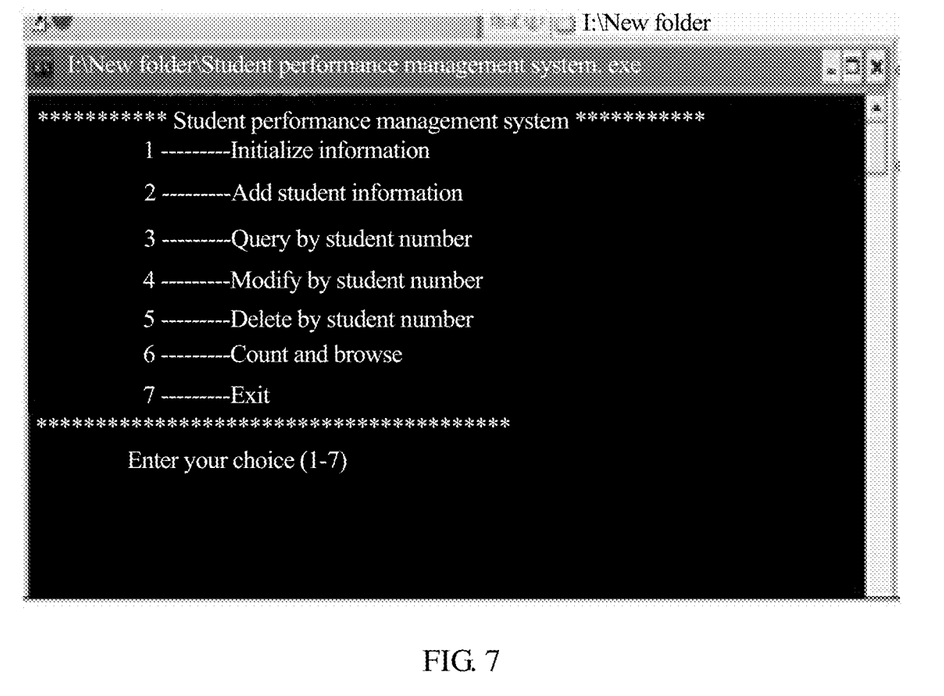
FIG. 7 is a schematic presentation diagram of a text-based interface according to an embodiment of the present invention.
Figure 8:
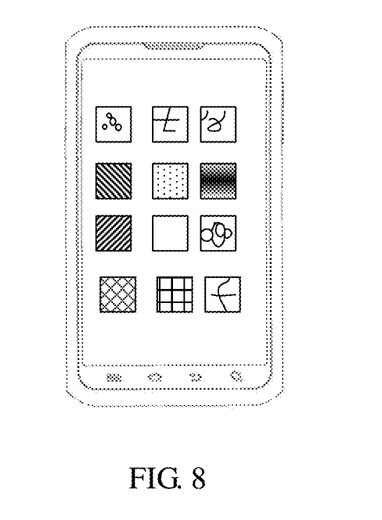
FIG. 8 is a schematic presentation diagram of a graphical interface according to an embodiment of the present invention.
Figure 9:
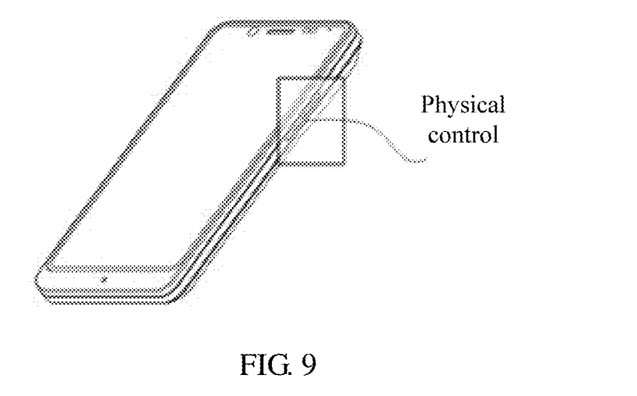
FIG. 9 is a schematic presentation diagram of a physical control interface according to an embodiment of the present invention.

That the terminal device is in a locked state indicates that the terminal device can correspondingly process only a part of user input, and cannot process another part of the user input, or cannot process another part of the user input in a same way as the device does in an unlocked state. That the terminal device is enabled to be in the locked state is to prevent misoperations, protect user privacy, or save an electric energy of the terminal device. Generally, the terminal device may enter the locked state by using a function of a system itself or an application program. When the terminal device is in the locked state, the content of the first interface is presented. FIG. 5 is a schematic presentation diagram of presenting content of a first interface when a terminal device is in a locked state. As shown in FIG. 5, an interface is a medium for an interaction and an information exchange between the system and a user, and the interface implements conversion between an internal form of information and a form that can be accepted by humans. An objective of the interface is to allow the user to conveniently and efficiently operate hardware, so as to achieve mutual interactions and complete work that is expected to be completed by using the hardware. The interface has a broad definition and includes a human-computer interaction interface, a graphical interface, and the like. An interface exists in any field involving information communication between the humans and a machine. The interface may specifically include a text-based interface, such as an interface (as shown in FIG. 7) that has characters and is obtained by programming by using a computer language. A graphical interface, that is, a graphical interface (GUI), is currently a most common interface worldwide. For example, an interface displayed when a mobile phone is in a power-on state is a graphical interface (as shown in FIG. 8), and a user interacts with hardware of the device by using a displayed graphic (an icon). A physical interface, that is, a physical control (as shown in FIG. 9), is one of means of interactions between the system and the user. Currently, relatively universal physical controls mainly include a volume button, a photographing button, a power-on button, an unlocking button, and the like on an apparatus. The content of the first interface is information interacted between the user and the terminal device. The information may include control information, and may further include non-control information, and the information may include one or more types of information that can be perceived by the user, such as auditory information, visual information, haptic information, action information, and smell information.

Optionally, the content of the first interface specifically includes system-level content or application program-level content preset by the terminal device or/and a user, where the presetting by the terminal device includes presetting, by the terminal device according to a use habit of the user or/and a class of the user.

Figure 10:
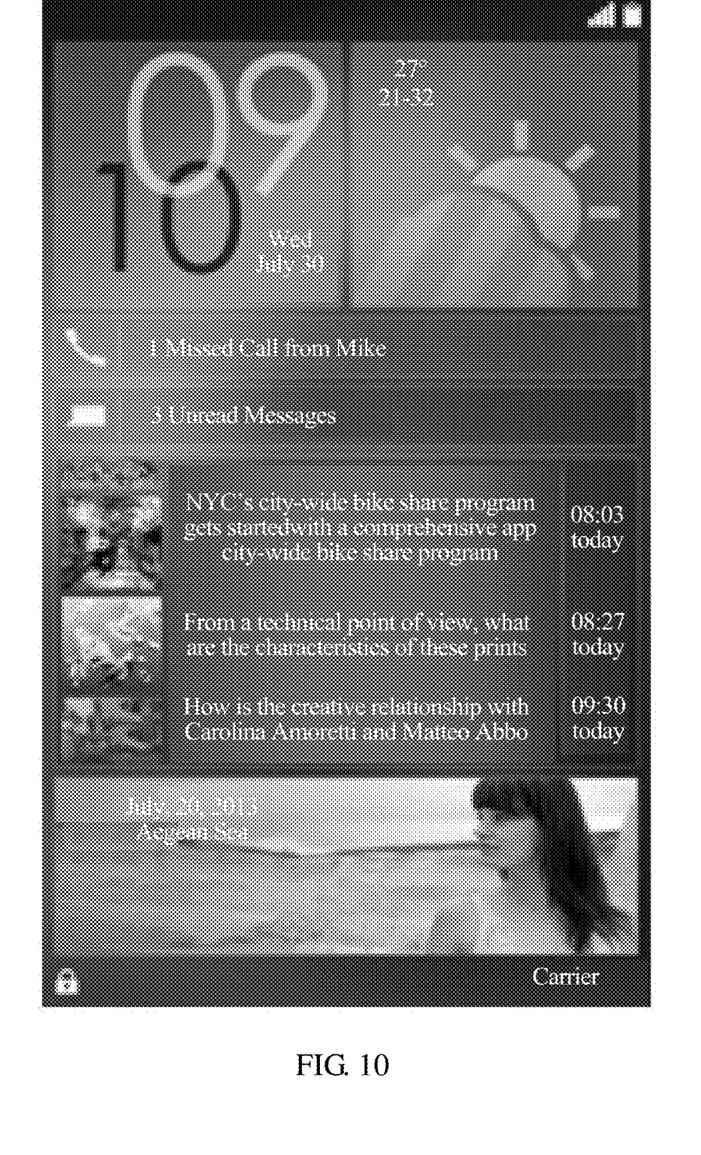
FIG. 10 is a schematic presentation diagram of system-level content according to an embodiment of the present invention.
Figure 11:
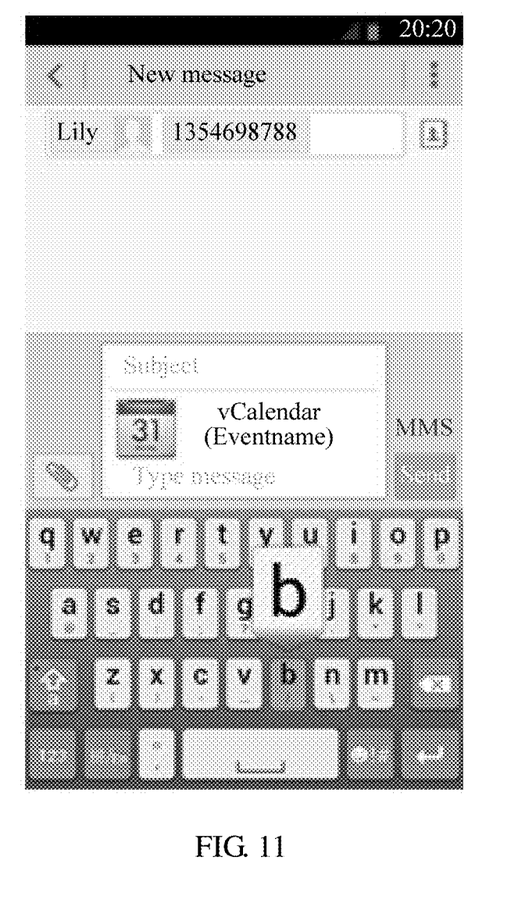
FIG. 11 is a schematic presentation diagram of application program-level content according to an embodiment of the present invention.

The system-level content (as shown in FIG. 10) may be content presented by the system to the user. Currently, common systems include a window system, an android system, an ios system, and the like. The application program-level content (as shown in FIG. 11, FIG. 11 presents SMS message application program content) may be content that is presented to the user after the terminal device starts an application program. Currently, common application programs include but are not limited to a telephone application program, a video conference application program, an e-mail application program, an instant messaging application program, a blog application program, a digital camera application program, a digital video camera application program, an Internet browsing application program, a digital music player application program, and/or a digital video player application program, and the like. The content of the first interface may be preset by the user, where the user designs the content of the first interface according to the use habit and a preference of the user. For example, the user may design the content of the first interface as an application program frequently used by the user, or as information (which includes but is not limited to time, information, news, and the like) that needs to be frequently viewed by the user, or as an interface that is latest displayed before the user locks the device last time. When the user presets the content of the first interface, the terminal device may also preset the content of the first interface according to the use habit of the user or the class of the user. That the terminal device presets the content of the first interface according to the use habit of the user may be: collecting the use habit of the user by active learning, and then setting the content of the first interface by simulating the use habit of the user, where the content of the first interface includes but is not limited to the foregoing content that can be designed by the user. That the terminal device presets the content of the first interface according to the class of the user may include: the terminal device presents, to a user by determining a class of the user who currently operates the device, content matching the class. It should be noted that, the terminal device may also complete setting of the content of the first interface by using any method that combines the foregoing presetting.

Optionally, the first interface is a first interface presented when the terminal device is in the locked state. It can be understood that, after the terminal device is activated in a particular manner, but is still in the locked state and cannot respond to all operations of the user, in this case, the first interface that is presented by the terminal device to the user is the first interface. For example, when a screen of the terminal device is lighted, an interface that is the first one presented to the user is the first interface.

Figure 13A:
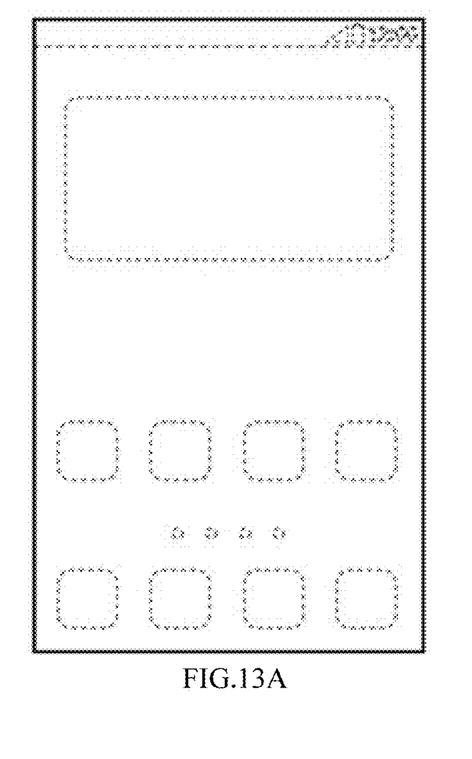
FIG. 13A and FIG. 13B are schematic presentation diagrams of presenting, by the terminal device in a locked state, content of a first interface to presenting an interface of an application program according to an embodiment of the present invention.
Figure 13B:
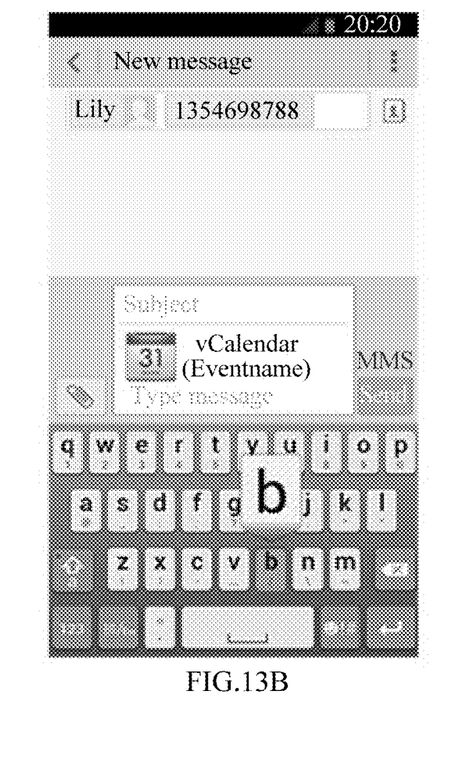

Optionally, as shown in FIGS. 13A and 13B, the user input to which the terminal device can respond in the locked state includes: the terminal device can start an application program according to the user input. Then, after the acquiring user input, and when the terminal device is in the locked state, the method further includes: starting the application program according to the user input; and presenting an interface of the application program. FIG. 13A is a schematic presentation diagram of a first interface when the device is in the locked state. In this case, content of the first interface is the system-level content. After the terminal device acquires the user input and starts an SMS message application program according to the user input, an interface of the SMS message application program is presented, as shown in FIG. 13B. It should be understood that, when the terminal device presents the interface shown in FIG. 13B, because the terminal device is in the locked state, the user input to which the terminal device can respond is less than the user input to which the terminal can respond in the unlocked state.

S102. Acquire user input.

The terminal device acquires the user input, and the user input may be obtained by using a touchscreen, or may be obtained by using another peripheral of the terminal device (for example, the user input may be acquired by using a microphone, a sensor, and the like). When a terminal with the touchscreen acquires the user input by using the touchscreen, the user may, by using, for example, one or more fingers, be in contact with or touch one or more graphics to complete entering, or may complete, by sliding a track, entering, or may complete, by gesturing, entering.

S1030. If the user input meets a preset first condition, switch the terminal device to an unlocked state, where the user input to which the terminal device can respond in the unlocked state is more than the user input to which the terminal device can respond in the locked state.

The preset first condition may be preset by the system or the user, and when the user input meets the first condition, the terminal device is switched from the locked state to the unlocked state. The unlocked state corresponds to the locked state, and the device in the unlocked state can respond to more operations of the user when compared with the device in the locked state. For example, the user input to which the terminal device can respond in the locked state includes: information about the terminal device according to the user input, starting an application program according to the user input, and unlocking the locked state according to the user input. In addition to the foregoing user input, the user output to which the terminal device can respond in the unlocked state further includes: making a call, editing information, and deleting information according to the user input, and the like.

Optionally, that the user input meets a preset first condition indicates that the user input meets a preset condition for unlocking the locked state of the terminal device. The user input that meets the preset condition for unlocking the locked state of the terminal device may include a gesture of the user on the touchscreen, such as a sliding gesture and a tapping gesture, or shaking the terminal device by the user, or changing a state of the terminal device by the user, or the like.

S104. Present content of the first interface after the terminal device is switched to the unlocked state, where the content that is of the first interface and presented by the terminal device when the terminal device is in the unlocked state is the same as the content that is of the first interface and presented by the terminal device when the terminal device is in the locked state.

After the terminal device is unlocked, the terminal device presents the content of the first interface to the user. In this case, the presented content of the first interface is the same as the content that is of the first interface and presented when the terminal device is in the locked state. The "same" indicates that, by comparing two things, there is no change, or no substantial change, or no obvious change that can be perceived by the user. Specifically, by comparing the content of the first interface in the locked state with the content of the first interface in the unlocked state, there is no change, or no substantial change, or no obvious change, between the two, that can be perceived by the user. It should be understood that, although the content of the first interface does not change between the two states, capabilities of interactions between the first interface and the user are different between the two different states.

Optionally, the first interface is a first interface presented after the terminal device is switched to the unlocked state. It can be understood that, after the terminal device is unlocked in a particular manner, in this case, the first interface that is presented by the terminal device to the user is the first interface. For example, after the terminal device completes sliding to unlock, or password unlocking, or pattern unlocking, or profile picture unlocking, or voice unlocking, or fingerprint unlocking, the first interface that is presented to the user is the first interface.

Figure 6:
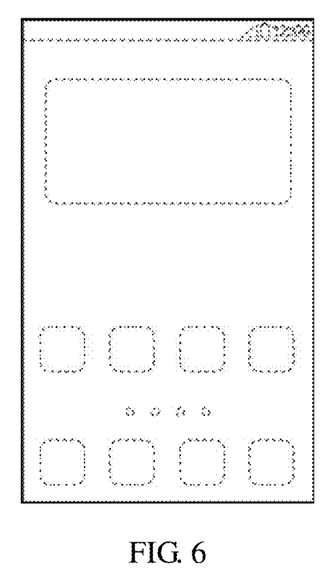
FIG. 6 is a schematic presentation diagram of a second interface according to an embodiment of the present invention.

Optionally, step S104 may specifically include: after the terminal device is switched to the unlocked state, presenting content of a second interface; and after presenting the content of the second interface, presenting the content of the first interface. It can be understood that, after the terminal device is unlocked in a particular manner, in this case, instead of directly presenting the first interface, the terminal device first presents the second interface to the user, and after presenting the second interface, the terminal device presents the first interface to the user according to the user input or a setting of the system. FIG. 5 is a schematic presentation diagram of a first interface, and FIG. 6 is a schematic presentation diagram of a second interface. As shown in FIG. 5 and FIG. 6, the first interface and the second interface are different interfaces, and content of the first interface is different from content of the second interface.

Optionally, after step S102 and before step S104, the method in this embodiment of the present invention further includes the following step: S1031. If the user input meets a preset second condition, present, according to the user input, content that is of the first interface and outside a current presentation range of the terminal device; or if the user input meets a preset second condition, and the content of the first interface is already fully presented in a current presentation range of the terminal device, prompt the user that the content of the first interface is already fully presented in the current presentation range of the terminal device.

The preset second condition may be preset by the system or the user, and when the user input meets the second condition, the content that is of the first interface and outside the current presentation range of the terminal device is presented according to the user input. Because a presentation capability of the terminal device is within a particular range, the content of the first interface may not be fully presented to the user in some cases. Therefore, the terminal device presents, according to the user input, the content that is of the first interface and outside the current presentation range to the user. In this case, the user input may be a frequently-used downward sliding gesture, page flipping gesture, or zooming-in or zooming-out gesture, or the like, which is not limited in the present invention. As shown in FIG. 5, the user may view the content of the first interface by using an upward or downward sliding gesture. If the user input meets the preset second condition, but the content of the first interface is already fully presented by the terminal device, in this case, the terminal device does not respond, or prompts the user with the fact that the content of the first interface is already fully presented in the current presentation range of the terminal device. The prompt may be conveyed to the user by using one or more means that can be perceived by the user, such as auditory information, visual information, haptic information, action information, and smell information. It should be understood that, the terminal device may have the foregoing presentation capability or prompt capability regardless of whether the terminal device is in the locked state or the unlocked state.

Optionally, that the user input meets a preset second condition indicates that the user input meets a preset condition for viewing information on the terminal device. The user input that meets the condition may be a gesture of the user on the touchscreen, such as a sliding gesture and a tapping gesture, or shaking the terminal device by the user, or changing a state of the terminal device by the user, or the like.

Optionally, after step S102 and before step S104, the method in this embodiment of the present invention further includes the following step: S1032. If the user input meets a preset third condition, prompt the user that the terminal device is in a locked state and cannot respond to the user input.

The preset third condition may be preset by the system or the user, and when the user input meets the third condition, the user is prompted with the fact that the terminal device is in the locked state and cannot respond to the user input. In this case, the user input belongs to the part of the user input to which the terminal device cannot respond in the locked state in step S101. A means of prompting the user is described above, which is not described herein again.

It should be noted that, in Embodiment 1 of the present invention, step S1030, S1031, and S1032 do not have a time sequence relationship, and an implementation sequence may be freely arranged, which is not limited in this embodiment of the present invention.

According to a method for presentation by a terminal device that is provided in this embodiment of the present invention, a lock screen interface that is frequently used in a current technology when the terminal device is in a locked state is reduced, and an interface presented after an unlocked state is unlocked is used to replace the lock screen interface, thereby achieving beneficial effects of reducing a memory burden of the terminal device, and improving efficiency and an interaction capability of the terminal device. In addition, a user operation is simplified, and efficiency in using the terminal device by the user is improved.

Embodiment 2

Figure 2:
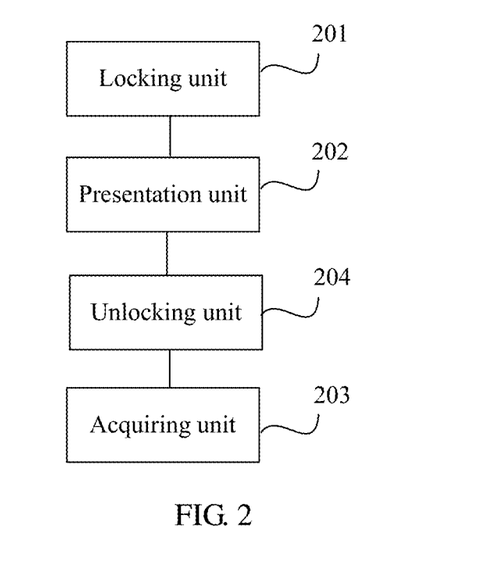
FIG. 2 is a schematic structural diagram of a terminal device according to Embodiment 2 of the present invention.

FIG. 2 is a schematic structural diagram of a terminal device according to Embodiment 2 of the present invention. As shown in FIG. 2, the terminal device in this embodiment of the present invention includes:

a locking unit 201, configured to enable the terminal device to be in a locked state, where when the terminal device is in the locked state, the terminal device can respond to a part of user input;

a presentation unit 202, configured to: when the locking unit 201 enables the terminal device to be in the locked state, present content of a first interface;

an acquiring unit 203, configured to acquire user input; and an unlocking unit 204, configured to: if the user input meets a preset first condition, switch the terminal device to an unlocked state; where the presentation unit 202 is further configured to present content of the first interface after the unlocking unit 204 switches the terminal device to the unlocked state, where the content that is of the first interface and presented when the terminal device is in the unlocked state is the same as the content that is of the first interface and presented when the terminal device is in the locked state, and the user input to which the terminal device can respond in the unlocked state is more than the user input to which the terminal device can respond in the locked state.

The locking unit 201 and the presentation unit 202 may be configured to execute the method in step S101 in Embodiment 1, the acquiring unit 203 is configured to execute the method in step S102 in Embodiment 1, the unlocking unit 204 is configured to execute the method in step S1030 in Embodiment 1, and the presentation unit 202 is further configured to execute the method in step S104 in Embodiment 1. For details about a specific method, refer to descriptions of the method in Embodiment 1, which are not described herein again.

Optionally, the content of the first interface specifically includes system-level content or application program-level content preset by the terminal device or a user, where the presetting by the terminal device includes presetting, by the terminal device according to a use habit of the user or a class of the user.

Optionally, the first interface is a first interface presented when the terminal device is in the locked state.

Optionally, the first interface is a first interface presented after the terminal device is switched to the unlocked state.

Optionally, when executing the method in step S104 in Embodiment 1, the presentation unit 202 is specifically configured to: after the terminal device is switched to the unlocked state, present content of a second interface; and after presenting the content of the second interface, present the content of the first interface. For details about a specific method, refer to descriptions of the method in Embodiment 1, which are not described herein again.

Optionally, the terminal device according to claim 13, where the terminal device further includes an application program unit 206, where the application program unit 206 is configured to: when the locking unit 201 enables the terminal device to be in the locked state, start an application program according to the user input acquired by the acquiring unit 203. The presentation unit 202 is further configured to: after the application program unit starts the application program, present an interface of the application program. The application program unit 206 is configured to execute the method in Embodiment 1. For details about a specific method, refer to descriptions of the method in Embodiment 1, which are not described herein again.

Figure 3:
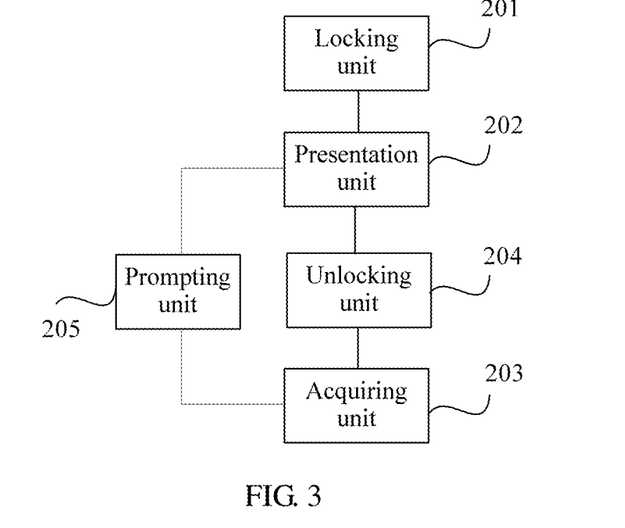
FIG. 3 is another possible schematic structural diagram of a terminal device according to Embodiment 2 of the present invention.

Optionally, as shown in FIG. 3, the terminal device further includes a prompting unit 205, where the prompting unit is configured to: if the user input meets a preset second condition, and the content of the first interface is already fully presented in a current presentation range of the terminal device, prompt the user that the content of the first interface is already fully presented in the current presentation range of the terminal device.

The prompting unit 205 is configured to execute the method in step S1031 in Embodiment 1. For details about a specific method, refer to descriptions of the method in Embodiment 1, which are not described herein again.

Optionally, as shown in FIG. 3, the prompting unit is further configured to: if the user input meets a preset third condition, prompt the user that the terminal device is in a locked state and cannot respond to the user input.

The prompting unit 205 is configured to execute the method in step S1032 in Embodiment 1. For details about a specific method, refer to descriptions of the method in Embodiment 1, which are not described herein again.

According to a terminal device provided in this embodiment of the present invention, a lock screen interface that is frequently used in a current technology when the terminal device is in a locked state is reduced, and an interface presented after an unlocked state is unlocked is used to replace the lock screen interface, thereby achieving beneficial effects of reducing a memory burden of the terminal device, and improving efficiency and an interaction capability of the terminal device. In addition, a user operation is simplified, and efficiency in using the terminal device by the user is improved.

Embodiment 3

Figure 4:
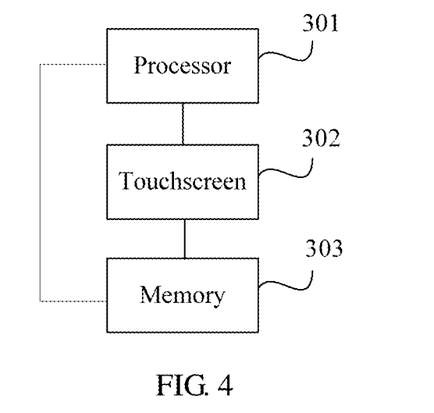
FIG. 4 is a schematic structural diagram of a terminal device according to Embodiment 3 of the present invention.

FIG. 4 is a schematic structural diagram of a terminal device according to Embodiment 3 of the present invention. As shown in FIG. 4, the terminal device includes a processor 301, a touchscreen 302, and a memory 303. The memory 303 is configured to store content of a first interface. The touchscreen 302 is configured to: when the terminal device is in a locked state, present content of the first interface, and the touchscreen 302 is further configured to acquire user input, where when the terminal device is in the locked state, the processor 301 can respond to a part of the user input acquired by the touchscreen. The processor 301 is configured to: if the user input acquired by the touchscreen 302 meets a preset first condition, switch the terminal device to an unlocked state. The touchscreen 302 is further configured to present content of the first interface after the unlocking unit switches the terminal device to the unlocked state, where the content that is of the first interface and presented when the terminal device is in the unlocked state is the same as the content that is of the first interface and presented when the terminal device is in the locked state. The terminal device is configured to execute the method in Embodiment 1. For details about a specific method, refer to descriptions of the method in Embodiment 1, which are not described herein again.

It should be understood that, the terminal device shown in FIG. 4 is merely an example of the terminal device, and the terminal device may have components more than or fewer than those shown in the diagram, may combine two or more components, or may have different component configurations. Various components shown in the diagram may be implemented in hardware including one or more signal processing and/or application-specific integrated circuits, in software, or in a combination of hardware and software.

The touchscreen 302 is configured to: when the terminal device is in the locked state, present the content of the first interface; is further configured to acquire the user input; and is further configured to present the content of the first interface after the unlocking unit switches the terminal device to the unlocked state. The touchscreen 302 is configured to execute the method in Embodiment 1. For details, refer to the method in S101, S102, and S104 in Embodiment 1. For details about a specific method, refer to the method in Embodiment 1, which is not described herein again. The touchscreen 302 is an input interface and an output interface between a mobile phone and a user. In addition to having a function of acquiring touch information and a control instruction of the user, the touchscreen 302 further presents visible output to the user, where the visible output may include a graphic, a text, an icon, a video, and the like. Optionally, the touchscreen is specifically configured to: after the terminal device is switched to the unlocked state, present content of the second interface, and after presenting the content of the second interface, present the content of the first interface.

The memory 303 may be configured to store the content of the first interface. The memory 303 may include a high-speed random access memory, and may further include a non-volatile memory, such as one or more magnetic disk storages, a flash memory, or another volatile solid-state storage. Optionally, the content of the first interface specifically includes system-level content or application program-level content preset by the terminal device or a user, where the presetting by the terminal device includes presetting, by the terminal device according to a use habit of the user or a class of the user. Optionally, the first interface is a first interface presented after the terminal device is switched to the unlocked state. Optionally, the first interface is a first interface presented when the terminal device is in the locked state. Optionally, the memory is further configured to store the content of the second interface.

The processor 301 is configured to execute the method in S103 in Embodiment 1. For details about a specific method, refer to the method in Embodiment 1, which is not described herein again. The processor 301 is a control center of the terminal device, connects to various components of the entire terminal device by using various interfaces and lines, and by running or executing a software program and/or a module that are/is stored in the memory 303 and by invoking data stored in the memory 303, executes various functions of the terminal device and processes data, so as to perform overall monitoring on the terminal device. Optionally, the processor 301 may include one or more processing units. Preferably, an application processor and a modem processor may be integrated into the processor 301. Optionally, the application processor mainly processes an operating system, an interface, an application program, and the like; and the modem processor mainly processes radio communications. It can be understood that the foregoing modem processor may not be integrated into the processor 301. It should further be understood that, the foregoing function is only one of functions that can be executed by the processor 301, and other functions are not limited in this embodiment of the present invention. Optionally, the processor is further configured to: if the user input acquired by the touchscreen meets a preset second condition, control, according to the user input, the touchscreen to present content that is of the first interface and outside a current presentation range of the terminal device.

According to a terminal device provided in this embodiment of the present invention, a lock screen interface that is frequently used in a current technology when the terminal device is in a locked state is reduced, and an interface presented after an unlocked state is unlocked is used to replace the lock screen interface, thereby achieving beneficial effects of reducing a memory burden of the terminal device, and improving efficiency and an interaction capability of the terminal device. In addition, a user operation is simplified, and efficiency in using the terminal device by the user is improved.

With descriptions of the foregoing embodiments, a person skilled in the art may clearly understand that the embodiments of the present invention may be implemented by hardware, firmware or a combination thereof. When the present invention is implemented by software, the foregoing functions may be stored in a terminal readable medium or transmitted as one or more instructions or code in the terminal readable medium. The terminal readable medium includes a terminal storage medium and a communications medium. Optionally, the communications medium includes any medium that enables a terminal program to be transmitted from one place to another. The storage medium may be any available medium accessible to a terminal. The following provides an example but does not impose a limitation: The terminal readable medium may include a RAM, a ROM, an EEPROM, a CD-ROM, or another optical disc storage or a disk storage medium, or another magnetic storage terminal device, or any other medium that can carry or store expected program code in a form of an instruction or a data structure and can be accessed by a terminal. In addition, any connection may be appropriately defined as a terminal readable medium. For example, if software is transmitted from a website, a server or another remote source by using a coaxial cable, an optical fiber/cable, a twisted pair, a digital subscriber line (DSL), or wireless technologies such as infrared ray, radio and microwave, the coaxial cable, the optical fiber/cable, the twisted pair, the DSL, or the wireless technologies such as infrared ray, radio and microwave are included in definition of a medium to which they belong. For example, a disk (Disk) and disc (disc) used by the embodiments of the present invention includes a compact disc CD, a laser disc, an optical disc, a digital versatile disc (DVD), a floppy disk, and a Blu-ray disc. Optionally, the disk generally copies data by a magnetic means, and the disc copies data optically by a laser means. The foregoing combination should also be included in the protection scope of the terminal readable medium.

In short, the foregoing descriptions are only embodiments of the technical solutions of the present invention, but are not intended to limit the protection scope of the present invention. Any modification, equivalent replacement, or improvement made without departing from the spirit and principle of the present invention shall fall within the protection scope of the present invention.

What is claimed is:

1. A mobile terminal with a touch screen, comprising at least one processor configured to:
   display an icon on a home screen of the mobile terminal, the icon corresponding to a first application program (FAP);
   detect a first gesture proximal the icon;
   in response to the first gesture, present a first window of the FAP after the FAP is started;
   detect a gesture for closing the first window of the FAP;
   close the first window of the FAP;
   display, on the touch screen, a first interface, the first interface including an interface of the FAP, the interface of the FAP being different from the first window of the FAP, the interface of the FAP occupying a first area on the touch screen, the first area being part of a whole display area of the touch screen, and first information of the FAP being displayed in the first area;
   detect a first user input;
   in response to the first user input, designate a second application program (SAP) to be displayed in the first interface;
   when the mobile terminal is in a locked state, display, on the touch screen, the first interface, the first interface including the interface of the FAP, an interface of the SAP and a first content determined by the mobile terminal based on a habit of using the mobile terminal by a user of the mobile terminal, the interface of the SAP occupying a second area on the touch screen, and the second area being part of the whole display area of the touch screen;
   detect the mobile terminal shifting from the locked state to an unlocked state while the first interface is displayed, and in response thereto, display the home screen instead of displaying the first interface; and
   when the mobile terminal remains in the unlocked state and the home screen is displayed, detect a second gesture, and in response thereto, display the first interface with the interface of the FAP, the interface of the SAP and the first content determined by the mobile terminal.

2. The mobile terminal according to claim 1, wherein the at least one processor is further configured to:
   when the mobile terminal is in the locked state and the first interface is displayed, detect a second user input;
   in response to the second user input, present a part of the first interface which is outside the current presentation range of the touch screen to the user.

3. The mobile terminal according to claim 2, wherein the second user input is a sliding gesture, a page flipping gesture, or a zooming gesture.

4. The mobile terminal according to claim 2, wherein the at least one processor is further configured to:
   prompt the user when the first interface is already fully presented in the current presentation range of the touch screen.

5. The mobile terminal according to claim 1, the at least one processor is further configured to:
   perform a first operation in response to detecting a third user input on the interface of the FAP when the mobile terminal is in the locked state;
   perform a second operation in response to detecting a fourth user input on the interface of the FAP when the mobile terminal is in the unlocked state;

wherein the first operation is different from the second operation.

6. The mobile terminal according to claim 1, wherein the FAP is a weather application program, a news application program, or an e-mail application program.

7. A method for presentation by a terminal device, wherein the method comprises:
displaying, by a terminal, an icon on a home screen of the terminal, the icon corresponding to a first application program (FAP);
detecting, by the terminal, a first gesture proximal the icon;
in response to the first gesture, presenting, by the terminal, a first window of the FAP after the FAP is started;
detecting, by the terminal, a gesture for closing the first window of the FAP;
closing, by the terminal, the first window of the FAP;
displaying, by the terminal, on the touch screen, a first interface, the first interface including an interface of the FAP, the interface of the FAP being different from the first window of the FAP, the interface of the FAP occupying a first area on the touch screen, the first area being part of a whole display area of the touch screen, and first information of the FAP being displayed in the first area;
detecting, by the terminal, a first user input;
in response to the first user input, designating, by the terminal, a second application program (SAP) to be displayed in the first interface;
when the terminal is in a locked state, displaying, by the terminal, on the touch screen, the first interface, the first interface including the interface of the FAP, an interface of the SAP and a first content determined by the terminal based on a habit of using the terminal by a user of the terminal, the interface of the SAP occupying a second area on the touch screen, and the second area being part of the whole display area of the touch screen;
detecting, by the terminal, the terminal shifting from the locked state to an unlocked state while the first interface is displayed, and in response thereto, displaying the home screen instead of displaying the first interface; and
when the terminal remains in the unlocked state and the home screen is displayed, detecting, by the terminal, a second gesture, and in response thereto, displaying, by the terminal, the first interface with the interface of the FAP, the interface of the SAP and the first content determined by the terminal.

8. The method according to claim 7, wherein when the terminal is in the locked state, display, on the touch screen, the first interface further comprises:
when the terminal is in a locked state and the first interface is displayed, detect a second user input;
in response to the second user input, present a part of the first interface which is outside the current presentation range of the touch screen to the user.

9. The method according to claim 8, wherein the second user input is a sliding gesture, a page flipping gesture, or a zooming gesture.

10. The method according to claim 8, wherein when the terminal is in a locked state, displaying, by the terminal, on the touch screen, the first interface further comprises:
prompting, by the terminal, the user when the first interface is already fully presented in the current presentation range of the screen.

11. The method according to claim 7, further comprises:
performing, by the terminal, a first operation in response to detecting a third user input on the interface of the FAP when the terminal is in the locked state;
performing, by the terminal, a second operation in response to detecting a fourth user input interface of the FAP when the terminal is in the unlocked state;
wherein the first operation is different from the second operation.

12. The method according to claim 7, wherein the FAP is a weather application program, a news application program, or an e-mail application program.

13. A non-transitory computer-readable storage medium comprising instructions which, when executed by a computer, cause the computer to:
display an icon on a home screen of a mobile terminal, the icon corresponding to a first application program (FAP);
detect a first gesture proximal the icon;
in response to the first gesture, present a first window of the FAP after the FAP is started;
detect a gesture for closing the first window of the FAP;
close the first window of the FAP;
display, on the touch screen, a first interface, the first interface including an interface of the FAP, the interface of the FAP being different from the first window of the FAP, the interface of the FAP occupying a first area on the touch screen, the first area being part of a whole display area of the touch screen, and first information of the FAP being displayed in the first area;
detect a first user input;
in response to the first user input, designate a second application program (SAP) to be displayed in the first interface;
when the mobile terminal is in a locked state, display, on the touch screen, the first interface, the first interface including the interface of the FAP, an interface of the SAP and a first content determined by the mobile terminal based on a habit of using the mobile terminal by a user of the mobile terminal, the interface of the SAP occupying a second area on the touch screen, and the second area being part of the whole display area of the touch screen;
detect the mobile terminal shifting from the locked state to an unlocked state while the first interface is displayed, and in response thereto, display the home screen instead of displaying the first interface; and
when the mobile terminal remains in the unlocked state and the home screen is displayed, detect a second gesture, and in response thereto, display the first interface with the interface of the FAP, the interface of the SAP and the first content determined by the mobile terminal.

14. The non-transitory computer-readable storage medium according to claim 13, wherein n the instructions to when the mobile terminal is in the locked state, display, on the touch screen, the first interface, further include instructions which cause the computer to:
prompt the user when the first interface is already fully presented in the current presentation range of the terminal device.

* * * * *

UNITED STATES PATENT AND TRADEMARK OFFICE
CERTIFICATE OF CORRECTION

PATENT NO. : 10,956,000 B2  
APPLICATION NO. : 16/251845  
DATED : March 23, 2021  
INVENTOR(S) : Cheng et al.

Page 1 of 1

It is certified that error appears in the above-identified patent and that said Letters Patent is hereby corrected as shown below:

On the Title Page

Page 2: Column 2, Foreign Patent Document, Line 3: "CN103034115A" should read -- CN103034445A --.

Page 2: Column 2, Foreign Patent Documents, Line 5: "ET" should read -- CN --.

Page 2: Column 2, Foreign Patent Documents, Line 6: "ET" should read -- CN --.

Signed and Sealed this  
Twenty-ninth Day of March, 2022

Drew Hirshfeld  
*Performing the Functions and Duties of the*  
*Under Secretary of Commerce for Intellectual Property and*  
*Director of the United States Patent and Trademark Office*